United States Patent [19]

Fujiki

[11] Patent Number: 5,039,736

[45] Date of Patent: Aug. 13, 1991

[54] METHOD FOR THE PREPARATION OF AN ORGANOPOLYSILOXANE COMPOSITION

[75] Inventor: Hironao Fujiki, Takasaki, Japan

[73] Assignee: Shin-Etsu Chemical Co., Ltd., Tokyo, Japan

[21] Appl. No.: 460,265

[22] Filed: Jan. 2, 1990

[30] Foreign Application Priority Data

Jan. 6, 1989 [JP] Japan .................................. 1-1086

[51] Int. Cl.$^5$ .............................................. C08K 5/54
[52] U.S. Cl. .................................... 524/730; 524/188; 523/209; 523/212
[58] Field of Search ................. 523/212, 209; 524/730, 524/188

[56] References Cited

U.S. PATENT DOCUMENTS 4,221,693  9/1980  Getson et al. .................... 523/212
4,695,603  9/1987  Inoue et al. ...................... 524/723

Primary Examiner—Melvyn I. Marquis
Attorney, Agent, or Firm—Wyatt, Gerber, Burke & Badie

[57] ABSTRACT

A curable organopolysiloxane composition, which is suitable for making a silicone rubber mold for mock-up molding with, for example, an epoxy resin, is prepared by the steps of (a) blending an organopolysiloxane having at least two silanol groups in a molecule, a finely divided silica filler having hydrophobic surface and hexamethyl disilazane to give a uniform mixture in a specified proportion; (b) subjecting the uniform mixture to a heat treatment; and (c) blending the heat-treated uniform mixture with an organosilane compound having at least three hydrolyzable groups in a molecule or a partial hydrolysis product thereof as a crosslinking agent. The composition has good flowability suitable for the preparation of a mold of any exquisite forms and the silicone rubber mold prepared from the composition exhibits good mold-releasability lastingly.

10 Claims, No Drawings

METHOD FOR THE PREPARATION OF AN ORGANOPOLYSILOXANE COMPOSITION

BACKGROUND OF THE INVENTION

The present invention relates to a method for the preparation of an organopolysiloxane composition or, more particularly, to a method for the preparation of an organopolysiloxane composition suitable for the preparation of a shaped silicone rubber article with good mold-releasability.

Silicone rubber compositions for mold preparation having good mold releasability have been widely used heretofore for duplication or replica preparation of cultural assets or artistic handcrafts. Along with the development of electric and electronic industries as well as automobile industries in recent years, these silicone rubber compositions have found applications in the production of industrial products such as parts of electric and electronic appliances as well as parts of automobiles in these industries.

Therefore, such silicone rubber compositions for mold preparation use are required to be suitable for producing duplicates having a complicated configuration exquisitely in large numbers. In addition, it is essential that the mold fabricated from the composition may have a high strength to be durable with good usability. Furthermore, the silicone rubber-made mold prepared from the silicone rubber composition should withstand the adverse influences of certain resinous materials in contact therewith, which may cause deterioration of the silicone rubber.

In order to satisfy these requirements, several methods have been proposed to obtain an improved silicone rubber composition including, for example, a method of compounding a hydrophobic silica filler after a treatment to be provided with surface-blocking organosiloxy groups represented by the formula $R_3SiO_{0.5}$, in which R is a monovalent hydrocarbon group, with an organopolysiloxane having molecular chain terminals blocked each with a silanol group (cf. Japanese Patent Publication No. 47-30422) and a method of compounding a reinforcing filler with an organopolysiloxane having a vinyl group at each of the molecular chain terminals thereof using a nitrogen containing organosilicon compound (cf. Japanese Patent Publication No. 40-19178). However, silicone rubber compositions obtained by these methods are still accompanied by a disadvantage that the above-mentioned requirement for the improvement in the durability of the mold-releasability is hardly obtained.

SUMMARY OF THE INVENTION

The present invention relates to a method for the preparation of an organopolysiloxane composition or, in particular, to a method for the preparation of an organopolysiloxane composition suitable for the preparation of a shaped article of a cured silicone rubber having good mold-releasability.

Thus, the invention provides a method for the preparation of an organopolysiloxane composition which comprises the steps of:

(a) blending 100 parts by weight of an organopolysiloxane having at least two silanol groups in a molecule, from 1 to 50 parts by weight of a finely divided silica filler having hydrophobic surface and from 1 to 30 parts by weight of hexamethyl disilazane to give a uniform mixture;

(b) subjecting the uniform mixture to a heat treatment; and (c) blending the heat-treated uniform mixture with from 0.5 to 20 parts by weight of an organosilane compound having at least three hydrolyzable groups in a molecule or a partial hydrolysis product thereof.

DETAILED DESCRIPTION OF THE PREFERRED EMBODIMENT

As is described above, the present invention relates to a method for the preparation of an organopolysiloxane composition capable of giving a cured silicone rubber article having good mold-releasability and overcoming the above-mentioned disadvantages in the prior art compositions. The inventive method is characterized by comprising the three essential steps of (a), (b) and (c) described above. In step (a), 100 parts by weight of an organopolysiloxane having at least two silanol groups in a molecule are uniformly blended with from 1 to 50 parts by weight of a finely divided hydrophobic silica filler and from 1 to 30 parts by weight of hexamethyl disilazane and the thus obtained uniform mixture is subjected to a heat treatment in step (b) and then further admixed with a specific organosilane compound or a partial hydrolysis product thereof in step (c). A curing catalyst also may be admixed in this step (c).

The inventor has completed the present invention in the course of his extensive studies on the method for obtaining a silicone rubber composition capable of giving a cured silicone rubber article having good mold-releasability markedly improved in durability as compared with similar prior art products and arrived at a discovery that an excellent durability of the mold releasability is exhibited by a silicone rubber obtained by curing an organopolysiloxane composition compounded with a hydrophobic silica filler obtained by a surface treatment of the particles of a hydrophilic silica filler with further admixture of hexamethyl disilazane.

The organopolysiloxane as the base component comprised in the organopolysiloxane composition prepared according to the inventive method should have at least two silanol groups in a molecule. Such an organopolysiloxane is represented by either of the following formulas, denoting a methyl group with the symbol Me:

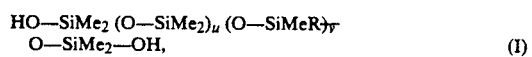
(I)

and

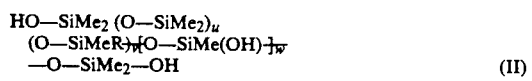
(II)

in which u is 0 or a Positive integer not exceeding 1,200, v is 0 or a positive integer not exceeding 200 with the proviso that u+v is in the range from 100 to 1,200, w is a positive integer not exceeding 20 and R is a fluorine-containing group selected from the class consisting of fluoroalkyl groups represented by the formulas $CF_2CH_2CH_2-$, $C_4F_9CH_2CH_2-$, $C_8F_{17}CH_2CH_2-$ and the like and fluoropolyether groups of the formula

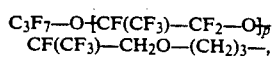
$CF(CF_3)-CH_2O-(CH_2)_3-$, wherein p is 0 or a positive integer not exceeding 5. The organopolysiloxane should have a viscosity not exceeding 100,000 centipoise or, preferably, in the range from 1000 to 30,000 centipoise at 25° C. When the average degree of polymerization of the organopolysiloxane is too low, the composition compounded therewith cannot give a cured silicone rubber having good physical properties. When the average degree of polymerization of the organopolysiloxane is too high, on the other hand, difficulties are encountered in the compounding work of the organopolysiloxane with the other ingredients in addition to the problem that the prepared composition is poorly flowable to be not suitable for the preparation of a mold having an exquisite form.

The above described organopolysiloxane is compounded in step (a) with a reinforcing silica filler having a specific surface area in the range from 50 to 800 m$^2$/g or, preferably, from 100 to 400 m$^2$/g as determined by the BET method. Specifically, the reinforcing silica filler should have hydrophobicity on the surface. Such a hydrophobic silica filler is well known in the art and can be prepared by the treatment of an intrinsically hydrophilic silica filler, such as so-called fumed silica fillers, with an organosilicon compound such as dimethyl dichlorosilane, methyl trichlorosilane, hexamethyl disilazane and the like under heating so that the hydroxy groups on the surface of the silica particles are blocked with the organosiloxy groups of the formulas $(CH_3)_3SiO_{0.5}$, $(CH_3)_2SiO$ and $CH_3SiO_{1.5}$ or, preferably, $CH_3SiO_{1.5}$. Several commercial products of such a hydrophobic silica filler are available on the market and can be used as such in the inventive method. Examples of suitable commercial products include R-812, R-972 and R-976 (trade names of products of DEGUSSA Co., West Germany), HDK-H.15 and HDK-H.25 (trade names of products by Wacker Chemie Co., West Germany), Reolosil MT-10, MT-30, DM-10 and DM-30 (trade names of products by Tokuyama Soda Co., Japan) and the like. A hydrophobic silica filler is defined to be a silica filler which cannot be wetted with water or floats on the water surface when it is put into water. Since a hydrophobic silica filler always contains carbon as a result of the surface treatment to render the silica particles hydrophobic, the content of carbon can be a measure of the hydrophobicity. In this regard, the hydrophobic silica filler used in the inventive method should contain at least 0.5% or, preferably, at least 1.5% by weight of carbon. When the hydrophobicity of a commercially available reinforcing silica filler is insufficient, it is preferable that the hydrophobic silica filler as purchased is further treated with hexamethyl disilazane to increase the hydrophobicity before the filler is used in the inventive method.

The amount of the hydrophobic silica filler compounded with the silanol-containing organopolysiloxane in step (a) of the inventive method is in the range from 1 to 50 parts by weight per 100 parts by weight of the organopolysiloxane. When the amount thereof is too small, no full reinforcing effect can be obtained thereby. When the amount thereof is too large, on the other hand, difficulties may be encountered in the compounding work of the filler with the organopolysiloxane in addition to the problem that the cured silicone rubber obtained from the composition may be poor in the rubbery elasticity.

In step (a) of the inventive method, the silanol-containing organopolysiloxane is compounded with the hydrophobic silica filler together with hexamethyl disilazane which serves, to further improve the flowability of the composition and mold releasability of the cured silicone rubber. The amount of the hexamethyl disilazane is in the range from 1 to 30 parts by weight or, preferably, in the range from 1 to 15 parts by weight per 100 parts by weight of the silanol-containing organopolysiloxane. When the amount thereof is too small, the above mentioned improving effect by the addition thereof cannot be fully obtained as a matter of course. When the amount thereof is too large, certain adverse influences are caused in the mechanical properties of the cured silicone rubber with no particular advantageous effects in addition to the problem caused by ammonia produced by the hydrolysis of hexamethyl disilazane.

In respect of the improvement obtained in the properties of the composition compounded with the hydrophobic silica filler, it is optional that a small amount of an alkoxy silane compound is added to the composition in combination with hexamethyl disilazane. The alkoxy silane compound is exemplified by methyl trimethoxy silane, phenyl trimethoxy silane, methyl phenyl dimethoxy silane, dimethyl dimethoxy silane and the like. It is further optional that a small amount of water is added to the composition in step (a) with an object to promote the advantageous effect by the hexamethyl disilazane. The amount of water, when added, should not exceed 100% by weight or, preferably, should be in the range from 5 to 100% by weight of the amount of the hexamethyl disilazane.

The compound obtained in step (a) by uniformly blending the silanol-containing organopolysiloxane, hydrophobic silica filler and hexamethyl disilazane is subjected to a heat treatment in step (b) so that the advantageous effect obtained by the admixture of hexamethyl disilazane can be fully exhibited. The heat treatment is performed at a temperature of 120 C. or higher or, preferably, in the range from 130° to 180° C. for a length of time of at least one hour or, preferably, in the range from 2 to 6 hours.

The uniform mixture of the silanol-containing organopolysiloxane, hydrophobic silica filler and hexamethyl disilazane prepared in step (a) and subjected to a heat treatment in step (b) is, preferably after cooling to room temperature, further admixed in step (c) with a specific hydrolyzable organosilane compound or a partial hydrolysis product thereof. The organosilane compound should have at least three hydrolyzable groups in a molecule and serves as a crosslinking agent for the organopolysiloxane having silanolic hydroxy groups. Namely, cured silicone rubbers can be obtained by the reaction between the hydrolyzable groups in this organosilane compound and the silanol groups in the organopolysiloxane. Examples of the hydrolyzable groups directly bonded to the silicon atom include alkoxy groups, aminoxy groups, acyloxy groups, alkenyloxy groups, amino groups, amide groups, ketoxime groups and the like. When the organopolysiloxane composition prepared according to the inventive method is used as a mold for the preparation of parts of electric or electronic instruments, alkoxy groups, alkenyloxy groups and ketoxime groups are preferred in respect of the absence of corrosiveness. Typical examples of suitable organosilane compounds include methyl trimethoxy silane, vinyl trimethoxy silane, phenyl trimethoxy silane, vinyl triethoxy silane, tetraethoxy silane, tetra(n-propoxy) silane, methyl tris(methyl ethyl ketoxime) silane, vinyl tris(methyl ethyl ketoxime) silane, methyl tris(isopropenyloxy) silane and vinyl tris(isopropenyloxy) silane. These hydrolyzable organosilane compounds can be used either alone or as a combination of two kinds or more according to need. Partial hydrolysis products of these hydrolyzable organosilane compounds can also be used in place of the silane compound. The amount of the organosilane compound or a partial hydrolysis product thereof added to the organopolysiloxane composition is in the range from 0.5 to 20 parts by weight or, preferably, from 1 to 10 parts by weight per 100 parts by weight of the organopolysiloxane having silanol groups. When the amount thereof is too small, the composition cannot be fully cured to give a cured silicone rubber. When the amount thereof is too large, on the other hand, the cured silicone rubber obtained from the composition may have an excessively high hardness not suitable for practical use as a material of a mold for replica preparation.

A curing catalyst to accelerate the condensation reaction of the silanol groups in the organopolysiloxane and the hydrolyzable organosilane compound or a partial hydrolysis product thereof can be compounded in step (c) together with the hydrolyzable organosilane compound or a partial hydrolysis product thereof to promote curing of the composition. Examples of suitable catalytic compounds for curing include metal salts of an organic acid such as dibutyl tin dilaurate, dibutyl tin dibenzyl maleate, dibutyl tin dioctoate, iron stearate, lead octoate and the like, titanate esters such as tetraisopropyl titanate and the like, titanium chelate compounds such as acetylacetonato titanium and the like and others. When vinyl tri(isopropenyloxy) silane is used as the hydrolyzable organosilane compound, 3-(tetramethylguanidino)propyl trimethoxy silane, 3-(tetramethylguanidino)propyl tris(trimethoxysilyl) silane and the like can also be used as the curing catalyst. The curing catalyst is not essential when vinyl triacetoxy silane, vinyl tri(N-methyl acetamido) silane or the like is used as the hydrolyzable organosilane compound. The amount of the curing catalyst added to the organopolysiloxane composition, when added, should be in the range from 0.01 to 10 parts by weight or, preferably, from 0.1 to 2 parts by weight per 100 parts by weight of the silanol-containing organopolysiloxane. When the amount thereof is too small, the catalytic promoting effect cannot be fully exhibited on the curing of the composition so that an unduly long time may be taken for complete curing of the composition or the composition can be cured only incompletely, in particular, in the core portion of a thick-walled body. When the amount thereof is too large, to the contrary, the storage stability of the composition would be decreased.

It is optional that the inventive composition is further admixed in step (c) with a small amount of water or an alcoholic compound, such as methyl alcohol, ethyl alcohol, propyl alcohol, ethylene glycol monomethyl ether, ethylene glycol monoethyl ether, glycerin, ethyleneglycol and the like, with an object to accelerate the curing reaction which proceeds by the mechanism of a condensation reaction.

In practicing the method of the invention, a preferred process is that the silanol-containing organopolysiloxane is blended with the hydrophobic silica filler together with hexamethyl disilazane to give a uniform mixture which is subjected to a heat treatment followed by the further addition of the hydrolyzable organosilane compound and, if desired, the curing catalyst to further continue mixing. It is also a possible way that, alternatively, a hydrophobic silica filler is subjected beforehand to a treatment with hexamethyl disilazane and the thus treated hydrophobic silica filler is compounded with the silanol-containing organopolysiloxane to give a composition which is further subjected to the steps (b) and (c). The inventive composition may optionally be admixed with various kinds of known additives conventionally used in silicone rubber compositions including coloring agents such as iron oxides, e.g., $Fe_2O_3$ and $Fe_3O_4$, titanium dioxide $TiO_2$, zinc oxide $ZnO$ and the like. Moreover, the mold-releasability can be further improved by the addition of a non functional organopolysiloxane having a higher viscosity than the silanol-containing organopolysiloxane or having a low viscosity of, for example, 5 to 100 centistokes at 25° C.

The organopolysiloxane composition thus obtained is subjected to curing to give a silicone rubber mold for mock-up or replica preparation. The silicone rubber mold can be prepared by pouring the organopolysiloxane composition obtained by the inventive method into a master mold and heating the composition, for example, at 60° C. so as to effect curing of the composition. The silicone rubber mold for mock-up preparation thus obtained has excellent mechanical properties such as tensile strength, ultimate elongation and tear strength and is particularly durable in the mold-releasability so that the silicone rubber composition can be used advantageously in the duplicate production of complicated or exquisite articles such as parts in electric and electronic instruments, parts of automobiles and the like.

In the following, the method of the invention for the preparation of an organopolysiloxane composition is described in more detail by way of examples and comparative examples. The term of "parts" in the following description always refers to "parts by weight" and the values of viscosity are all those obtained by the measurment at 25° C.

EXAMPLES 1 TO 3 AND COMPARATIVE EXAMPLES 1 AND 2.

Compounding work was undertaken in each of Examples 1 to 3 in a kneader in which 5 parts of hexamethyl disilazane and 2 parts of water were added to a compound prepared from 100 parts of a dimethylpolysiloxane having a viscosity of 5000 centipoise and terminated at each molecular chain end with a hydroxy dimethyl silyl group and 20 parts of a commercially available hydrophobic silica filler having a specific surface area of about 300 $m^2/g$ as measured by the BET method. The mixture was subjected to a heat treatment at 160° C. for 4 hours. The hydrophobic silica fillers used were R-812, R-976 and HT-30 (supra) in Examples 1, 2 and 3, respectively. The hydrophobic treatment agents for these commercial silica filler products are reportedly hexamethyl disilazane, dimethyl dichlorosilane and methyl trichlorosilane, respectively. Each of these hydrophobic silica fillers contained about 2.0% by weight of carbon as determined using a carbon analyzer for metals. The uniform mixture was subjected to a heat treatment in the kneader at 160° C. for 4 hours.

After cooling to room temperature, 100 parts of the mixture above obtained were admixed with 3 parts of an ethyl polysilicate and 0.1 part of dibutyl tin dioctoate and further kneaded to give a uniform organopolysiloxane composition. The composition was shaped into a sheet which was kept at 25° C. for 24 hours to be converted into a cured silicone rubber sheet, of which physical properties were measured according to the method specified in JIS K 6301 to give the results shown in Table 1 for the items including the viscosity of the composition in centipoise and hardness, ultimate elongation and tensile strength of the cured rubber sheets. Each of these compositions had good flowability suitable for pouring into a master mold.

A metal-made master mold was filled with the composition which was cured therein by heating at 60° C. for 2 hours to give a silicone rubber mold having a cavity for resin molding. The cavity of the mold was filled with an epoxy resin which was cured therein to give a mock-up of the master mold. This molding process of the epoxy resin was repeated by using the same silicone rubber mold to record the largest number of the epoxy resin mock ups having acceptable gloss on the surface, which means a gloss of 80% or higher of that on the article obtained in the first time molding as measured according to the method specified in ASTM D 523, obtained by using one and the same silicone rubber mold to give the results shown in Table 1. The epoxy resin mock-ups obtained by the 20th time molding each had a smooth surface without wrinkle lines.

For comparison, another organopolysiloxane composition was prepared in Comparative Example 1 in the same formulation and in the same manner as in Example 2 excepting omission of hexamethyl disilazane and water. The composition was poorly flowable with partial sagginess. The epoxy resin mock-ups obtained by the molding work using the silicone rubber mold prepared from this comparative composition had cracks on the surface. No mechanical properties could be measured of the cured rubber sheet of this composition.

For further comparison, an organopolysiloxane composition was prepared in Comparative Example 2 in just the same formulation and in the same manner as in Examples 1 to 3 excepting replacement of the hydrophobic silica filler with a hydrophobic silica filler (Aerosil 300, a product by Nippon Aerosil Co.). The composition had good flowability. The results of testing with this comparative composition are shown also in Table 1. The epoxy resin mock-up obtained by the 20th time molding using the silicone rubber mold prepared from this comparative composition had wrinkles on the surface.

TABLE 1

|  |  | Example | | | Comparative Example |
|---|---|---|---|---|---|
|  |  | 1 | 2 | 3 | 2 |
| Viscosity of composition, poise |  | 600 | 630 | 700 | 550 |
| Physical properties of cured rubber sheet | Hardness, JIS A | 35 | 36 | 39 | 37 |
|  | Ultimate elongation, % | 400 | 380 | 300 | 350 |
|  | Tensile strength, kgf/cm$^2$ | 50 | 50 | 45 | 55 |
| Maximum number of epoxy resin molding |  | 18 | 20 | 23 | 15 |

What is claimed is:

1. A method for the preparation of an organopolysiloxane composition which comprises the steps of:

(a) blending 100 parts by weight of an organopolysiloxane having at least two silanol groups in a molecule, from 1 to 50 parts by weight of a finely divided silica filler having a hydrophobic surface and a specific surface area in the range from 50 to 800 m$^2$/g., and from 1 to 30 parts by weight of hexamethyl disilazane to give a uniform mixture;

(b) subjecting the uniform mixture to a heat treatment at a temperature in the range from 120° to 180° C. for a length of time of at least one hour; and (c) blending the heat-treated uniform mixture with from 0.5 to 20 parts by weight of an organosilane compound having at least three hydrolyzable groups in a molecule or a partial hydrolysis product thereof.

2. The method for the preparation of an organopolysiloxane composition as claimed in claim 1 wherein the organopolysiloxane having at least two silanol groups in a molecule has a viscosity in the range from 1,000 to 30,000 centipoise at 25° C.

3. The method for the preparation of an organopolysiloxane composition as claimed in claim 1 wherein the organopolysiloxane having at least two silanol groups in a molecule is a dimethyl polysiloxane terminated at each molecular chain end with a dimethyl hydroxy silyl group.

4. The method for the preparation of an organopolysiloxane composition as claimed in claim 1 wherein the surface of the finely divided silica filler is blocked with methyl siloxane units of the formula $(CH_3)_3SiO_{0.5}$, $(CH_3)_2SiO$ or $CH_3SiO_{1.5}$.

5. The method for the preparation of an organopolysiloxane composition as claimed in claim 1 wherein the amount of the hexamethyl disilazane is in the range from 1 to 15 parts by weight per 100 parts by weight of the organopolysiloxane.

6. The method for the preparation of an organopolysiloxane composition as claimed in claim 1 wherein the hydrolyzable group in the organosilane compound having at least three hydrolyzable groups in a molecule is selected from the class consisting of alkoxy groups, alkenyloxy groups and ketoxime groups.

7. The method for the preparation of an organopolysiloxane composition as claimed in claim 1 wherein the amount of the organosilane compound having at least three hydrolyzable groups in a molecule is in the range from 1 to 10 parts by weight per 100 parts by weight of the organopolysiloxane.

8. The method for the preparation of an organopolysiloxane composition as claimed in claim 1 wherein a curing catalyst is added to the mixture in step (c) together with the organosilane compound having at least three hydrolyzable groups in a molecule or a partial hydrolysis product thereof.

9. The method for the preparation of an organopolysiloxane composition as claimed in claim 8 wherein the curing catalyst is selected from the class consisting of metal salts of a carboxylic acid, titanate ester compounds and chelate compounds of titanium.

10. The method for the preparation of an organopolysiloxane composition as claimed in claim 8 wherein the amount of the curing catalyst is in the range from 0.01 to 10 parts by weight per 100 parts by weight of the organopolysiloxane.

* * * * *